United States Patent [19]

Cody et al.

[11] Patent Number: 4,932,688
[45] Date of Patent: Jun. 12, 1990

[54] SYSTEM FOR CONNECTING FLUID COUPLINGS

[75] Inventors: Joseph C. Cody, Huntsville; Paul R. Matthews, Scottsboro, both of Ala.

[73] Assignee: The United States of America as represented by the Administrator of the National Aeronautics and Space Administration, Washington, D.C.

[21] Appl. No.: 161,682

[22] Filed: Feb. 29, 1988

[51] Int. Cl.[5] ............................................. F16L 35/00
[52] U.S. Cl. ...................................... 285/82; 285/361
[58] Field of Search ............... 285/360, 361, 362, 396, 285/81, 82, 87, 376, 377, 272

[56] References Cited

U.S. PATENT DOCUMENTS

| 771,094 | 9/1904 | Rhoads | 285/362 |
| 1,762,572 | 6/1930 | Davidson | 285/396 |
| 3,455,580 | 7/1969 | Howard | 285/396 |
| 3,700,267 | 10/1972 | Piegza | 285/362 |

FOREIGN PATENT DOCUMENTS

| 684258 | 11/1939 | Fed. Rep. of Germany | 285/396 |
| 7736 | 2/1894 | Switzerland | 285/362 |

*Primary Examiner*—Dave W. Arola
*Attorney, Agent, or Firm*—William J. Sheehan; John R. Manning; Jerry L. Seemann

[57] ABSTRACT

A system for mating fluid transfer couplings is constructed having a male connector 32 which is provided with a pair of opposed rollers 54 mounted to an exterior region thereof. A male half 30 of a fluid transfer coupling is rotatably supported in an opening 36 in an end 38 of connector 32 and is equipped with an outwardly extending forward portion 20. Forward portion 20 locks into an engagement and locking region 16 of a female half 60 of the fluid transfer coupling, with female half 60 being rotatably supported in a receptacle 62. Receptacle 62 has an opening 70 aligned with locking region 16, with this opening having a pair of concentric, annularly disposed ramps 74 extending around an interior portion of opening 70. These ramps are inclined toward interior 78 of receptacle 62 and are provided with slots 76 through which rollers 54 of connector 32 pass. After connector 32 is inserted into receptacle 62 (engaging forward portion 20 into engagement region 16), relative rotation between connector 32 and receptacle 62 causes rollers 54 to traverse ramps 74 until the rollers abut and are gripped by retainers 82. This axially forces forward portion 20 into locked, sealed engagement with engagement region 16.

10 Claims, 3 Drawing Sheets

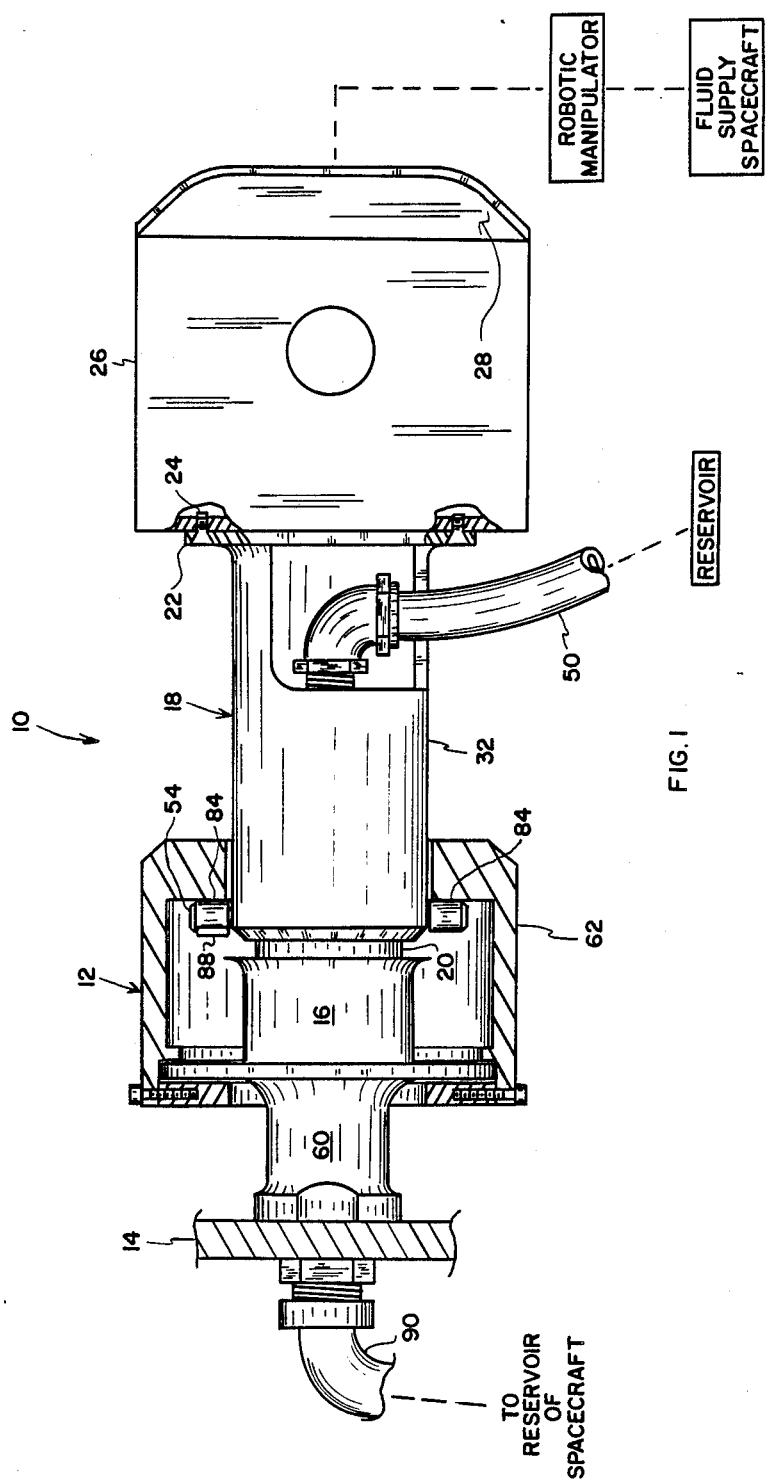

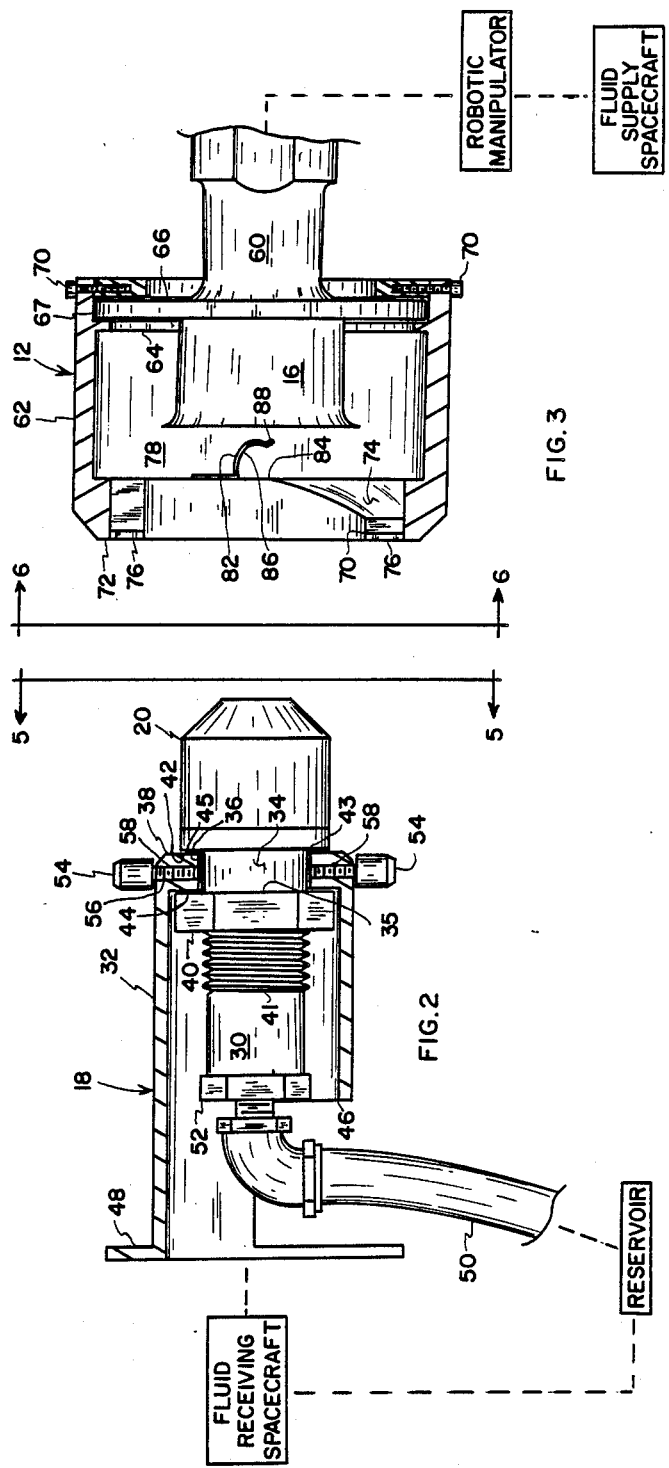

SYSTEM FOR CONNECTING FLUID COUPLINGS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates generally to systems and apparatus for connecting fluid transfer couplings together and more particularly to a system wherein a small amount of torque is utilized to axially force together and lock a pair of fluid couplings.

BACKGROUND OF THE INVENTION

As the longevity of some spacecraft in space has increased with technology to 20 years or more, it has become necessary to replace fluids aboard these spacecraft. Manned servicing has been demonstrated to be one approach to replacing these fluids, but the cost of protecting a man/men from the hostile environs of space is particularly high. For many tasks, unmanned, remotely controlled spacecraft equipped with remote manipulators provide a cost effective alternative to manned servicing, especially when potentially dangerous propellants, such as Hydrazine, are to be transferred from a refueling vehicle to an on-station satellite.

Toward this end, fluid transfer couplings have been designed for use in space, but these couplings have operating requirements which may exceed the capabilities of remote manipulators to connect and disconnect them. For example, one such fluid transfer coupling requires a closing force of 42 pounds to be applied between the two halves of the coupling, a force which may not only exceed the capability of the manipulator, but which would force the two vehicles apart if the only docking connection between them is the fluid coupling. As orbital spacecraft typically are provided with small thrusters which produce only a limited amount of thrust to maintain or change their orbits, it is apparent that the force required to close this coupling would move a satellite out of its orbit, requiring expenditures of fuel to replace it in its selected orbit. In order to overcome this problem, it would be necessary for the refueling spacecraft and the satellite to each be equipped with docking hardware to enable a docked configuration between them. This extra docking hardware is expensive from a manufacturing standpoint and further adds to the respective weights of the vehicles to be lifted from Earth.

In accordance with this invention, the applicants have provided a system for mating fluid transfer couplings which is easily adapted to robotic manipulators, and which further requires only a small amount of torque (two foot-pounds by the robotic manipulator) to close the couplings.

SUMMARY OF THE INVENTION

In accordance with this invention, a male coupling member used in a system for separably locking fluid transfer couplings has an end provided with radially extending locking members. A mating female coupling member used in this system is provided with an opening aligned with the female half of the fluid coupling which engages the end of the male coupling member. An annular region around the opening is provided with ramps for engaging the radially extending locking members, and retainers mounted at distal ends of the ramps provide gripped engagement with the locking members after being engaged thereby.

BRIEF DESCRIPTION OF THE DRAWINGS

FIG. 1 is a partially cut-away view of portions of the present invention in coupled relation therebetween.

FIG. 2 is a partially diagrammatic, partially cut away, view of a male connector of the present invention.

FIG. 3 is a partially diagrammatic, partially cut away, view of a matching receptacle of the present invention.

DESCRIPTION OF THE PREFERRED EMBODIMENT

Figure 6:
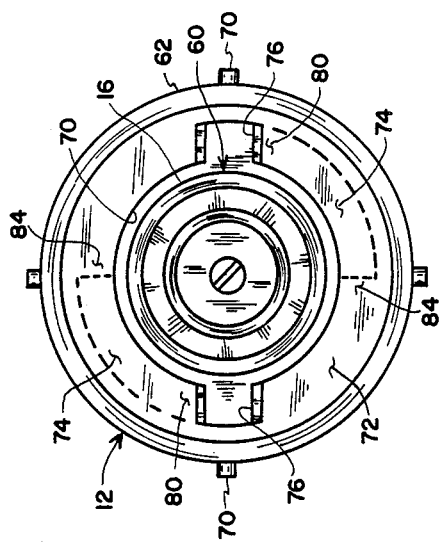
FIG. 6 is an end view of a receptacle having a mating half of a fluid transfer coupling mounted therein, this view being taken along line 6—6 of FIG. 3.
Figure 4:
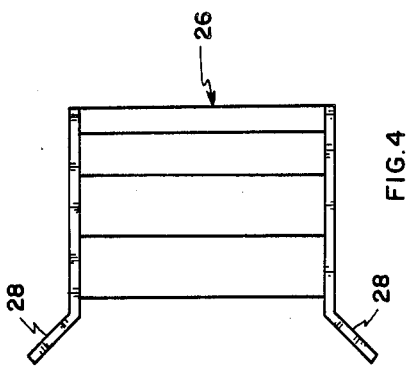
FIG. 4 is an elevational view of a support structure to which either the male connector of the receptacle may be mounted for gripped engagement with a robotic manipulator.
Figure 5:
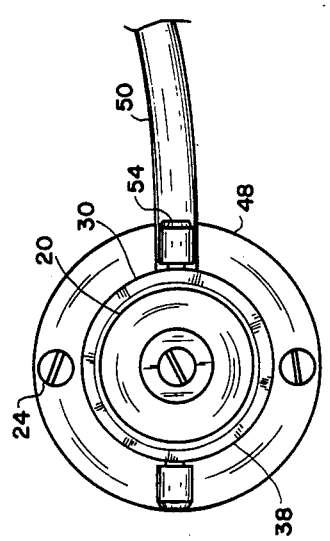
FIG. 5 is an end view of a male connector having one-half of a fluid coupling mounted thereto, this view being taken along line 5—5 of FIG. 2.

Referring to FIG. 1, a system 10 is shown for transferring a fluid from one spacecraft to another spacecraft. To accomplish this, a female member 12 is shown mounted to a bulkhead 14 of the supplied spacecraft, with this member being provided with an engagement and locking portion 16. For engaging in a locked and sealed relation with portion 16 of female member 12, a male member 18 is provided with a forward portion 20 which, upon being axially forced into engagement portion 16 of female member 12, locks and seals therewith. Male member 18 is connected at a rear flanged portion 22, as by screws 24, to a support structure 26 which is provided with flanges 28 adapted to be gripped by a robotic manipulator arm mounted to the fluid supplying spacecraft. The robotic manipulator provides the forces necessary to enable a mating configuration between members 12 and 18.

Referring now to FIG. 2, which reveals details of male member 18, it is seen that member 18 consists of a male fluid transfer coupling half 30 which is rotatably mounted to and partially housed by a male connector 32. For mounting coupling half 30 in connector 32, coupling half 30 is provided with a recessed region 34 which is fitted into an opening 36 in end 38 of connector 32. Recessed region 34 is sized slightly smaller in diameter than opening 36, with region 34 being constructed slightly larger than the width of opening 36. A locking nut 40 is threadably engaged by threads 41 of coupling 30 and secured against a shoulder 35 of recessed region 34. This mounting configuration rotatably secures male coupling half 30 to connector 32 by loosely holding nut 40 and shoulder 42 of forward region 20 between inner and outer shoulders 44 and 45, respectively, surrounding opening 36. An opening 46 in an opposite end 48 of connector 32 allows routing of a fluid conveying tubing or hose 50 therethrough, with this hose being connected to an end 52 of coupling half 30 housed in connector 32. For providing means for engaging female member 12, a pair of rollers 54 having threaded shafts 56 are threaded into opposed threaded openings 58 adjacent end 38 of connector 32.

Referring now to FIG. 3, which illustrates details of female member 12, a female fluid transfer coupling half 60 having engagement portion 16 is shown rotatably mounted to a female receptacle 62. This is done by providing receptacle 62 with a flange 64 against which a mounting plate 66 of coupling half 60 is loosely fitted against. Mounting plate 66 is sized slightly smaller in diameter than a circular region 67 within which plate 66 is fitted, and an annular securing ring 68 is bolted in place behind mounting plate 66 by bolts 70. This configuration rotatably holds coupling half 60 within receptacle 62.

FIGS. 3 and 6 show receptacle 62 provided with an opening 70 in end 72, with opening 70 being aligned with engagement portion 16 of coupling half 60. A pair of concentric ramps 74 (dotted lines) are positioned about an annular interior region of opening 70, with these ramps disposed approximately 180° to each other. A pair of opposed slots 76 communicating with opening 70 and interior 78 of receptacle 62 allows rollers 54 to pass therethrough, with slots 76 being positioned at proximal ends 80 of ramps 74. Ramps 74 are inclined approximately 10° toward interior 78 of receptacle 62 and extend approximately 90° around opening 70.

For providing releasable locked or gripped engagement of rollers 54, a pair of retaining stops 82 (only one shown in FIG. 3), constructed of spring steel, are positioned at distal ends 84 of ramps 74. Stops 82 limit the travel of rollers 54 along ramps 74 and also serve to positively hold rollers 54. These stops are configured with a generally circular region 86 which is engaged by rollers 54 when the rollers are in an abutting relation with stops 82. Ends 88 of stops 82 are spaced from distal ends 84 of ramps 74 a distance which is smaller than the diameter of rollers 54 and provide a pinching effect on the rollers as they pass thereunder, which in turn provides a positive locking effect as rollers 54 are gripped by circular regions 86.

It is to be noted that slight modifications would allow coupling halves 30 and 60 to be mounted in either connecting member 32 or receptacle 62. Likewise, connecting member 32 and receptacle 62 may be mounted either to a spacecraft to be refueled or to a robotic manipulator, as diagrammatically illustrated in FIGS. 1, 2, and 3.

It is to be further noted that for this particular fluid coupling, the axial force required to lock and seal the coupling together is approximately 40 pounds, although this force may vary with other designs of fluid couplings which may be used (with minor modifications) in conjunction with connector 32 and receptacle 62. Several types of these couplings have been developed, and they conventionally employ a releasable locking mechanism (not shown) incorporated in halves 30 and 60 which locks and seals halves 30 and 60 together once they are forced together by connector 32 and receptacle 62, as will be described.

In operation, receptacle 62 and male connector 32 are fitted with either of coupling halves 30 and 60. For purposes of illustration, the drawings show a male-type coupling half 30 mounted to male connector 32 and a female-type coupling half 60 mounted to receptacle 62. FIG. 1 also shows male connector 32 mounted to support structure 26, which is gripped by a robotic manipulator, while receptacle 62 is shown mounted to a bulkhead 14 of a spacecraft. Hoses 50 and 90 are shown leading to fluid reservoirs, but receptacle 62 may easily be mounted directly to walls of a reservoir (not shown).

In order to couple coupling halves 30 and 60 in locked relation (FIG. 1), male connector 32 is inserted by the robotic manipulator (or, if necessary, by a space-suited man) into receptacle 62, with rollers 54 passing through slots 76. In this configuration, forward portion 20 of male half 30 is inserted into locking region 16 of female half 60 prior to sealably locking therein. At this point, forward portion 20 and locking region 16 become frictionally engaged by means not shown. After male half 30 is inserted as described, the robotic manipulator is instructed to rotate male connector 32 in a direction (clockwise in FIG. 6) which causes rollers 54 to transverse inwardly along ramps 74, rotating male connector 32 in receptacle 62 while coupling halves 30 and 60, being rotatably supported as described, remain stationary with respect to each other. This axially forces forward portion 20 into locking region 16 of half 60, and when the force required to lock halves 30 and 60 together is reached, the same is achieved. As earlier described, this type of fluid coupling requires approximately 40 pounds of axial force to enable the locking together of halves 30 and 60, with this axial force being achieved by approximately 2 ft/lbs. of torque applied by the robotic manipulator. Locked engagement of halves 30 and 60 would typically occur at a point just short of where rollers 54 abut stops 82, with continued rotation of connector 32 after locking occurs, causing rollers 54 to pass between distal ends 84 of ramps 74 and ends 88 of stops 82. This forces ends 88 apart as rollers 54 pass thereunder, with ends 88, in conjunction with circular regions 86, effecting gripping engagement with rollers 54. This enables a releasable, positively locked engagement between connecting member 32 and receptacle 62, after which fluid is transferred through self-locking coupling halves 30 and 60. Couplings 30 and 60 are then demated, which is done by rotating male connector 32 in an opposite direction (counterclockwise in FIG. 6) to the initial rotation. Upon the occurrence of this demating rotation, rollers 54 are positively disengaged from circular region 86 of stops 82, and at a point just after rollers 54 become disengaged, coupling halves 30 and 60 become unlocked and seal themselves (by means not shown) with respect to any pressure which may be present in their respective reservoirs. Rollers 54 are then rotated into alignment with slots 76, and at this point the robotic manipulator is instructed to withdraw male connector 32 from receptacle 62.

From the foregoing, it is apparent that the applicants have provided a system and apparatus for effecting a coupled, locked relation between fluid transfer couplings. This system is appropriate for use in a microgravity environment because of its ability to translate a two foot-pound rotational torque to an axial force of approximately 40 pounds, and which is simple in its operation, requiring no external power and which uses only the forces provided by a robotic manipulator.

We claim:

1. An apparatus for housing and separably engaging mating halves of a fluid coupling comprising:
   a male coupling member rotatably mounting one of said halves therein and having a first end provided with a plurality of locking members extending radially therefrom;
   a female coupling member rotatably mounting the other half of said fluid coupling therein and having an opening aligned with said other half of said fluid coupling;

ramp means defined by a like plurality of spaced annular surfaces disposed in inclined relation about said opening, for engaging said plurality of locking members; and retaining means mounted in said opening of said female coupling member at a distal end of each said ramp means, for gripped engagement with said locking members of said male coupling member subsequent to said locking members traversing said annular surfaces responsive to relative rotation in a selected direction between said male coupling and said female coupling member, whereby the two halves of said fluid coupling are forced together in locked engagement.

2. An apparatus as set forth in claim 1 wherein said plurality of locking members comprises a pair of rollers radially positioned approximately 180° apart on and extending from sides of said male coupling member.

3. An apparatus as set forth in claim 2 wherein said ramp means comprises a pair of annular, opposed, radially concentric ramps positioned about an interior side of said opening, said ramps being further provided with opposed slots positioned at proximal ends thereof, said slots communicating with said opening and said interior of said female member and being disposed for allowing passage of said rollers therethrough, said ramps being inclined away from said slots.

4. An apparatus as set forth in claim 3 wherein said ramps each extends approximately 90° from said slots, whereby rotation required to achieve a locked relation between said male and female coupling members is approximately 90°.

5. An apparatus as set forth in claim 4 wherein each said retaining means comprises a stop member constructed of a resilient material, said stop member having a generally circular region for gripped engagement with one of said pair of rollers, and said circular region having one end disposed for passage thereunder of one of said pair of rollers in pinched relation between said one end of said stop member and said distal end of said ramp.

6. An apparatus as set forth in claim 5 wherein said resilient material is spring steel.

7. An apparatus as set forth in claim 1 wherein a second end of said male coupling member is disposed for routing fluid transferring tubing therethrough, said tubing being coupled to said male half of said fluid transfer coupling.

8. An apparatus for transferring fluid from one spacecraft to another and which separably engages mating halves of a fluid transfer coupling mechanism comprising:

a cylindrical male connector having one end rotatably mounting a male half of said fluid transfer coupling thereto, said end having a plurality of rollers mounted thereon; and a receptacle having a generally hollow interior and one end rotatably mounting a female half of said fluid transfer coupling therein, and an opposite end of said receptacle being provided with an opening aligned with said female half, and having a plurality of annularly disposed ramps thereabout for engaging said rollers, and a like plurality of slots in communicating relation to said interior and said opening, said slots each positioned at proximal ends of said ramps, for allowing passage therethrough of said rollers and retaining means positioned at distal ends of said ramps, for gripping said rollers, whereby, responsive to insertion of said male connector into said receptacle and to relative rotation in a selected direction therebetween, said rollers are urged inwardly along said ramps, axially forcing said male half of said fluid coupling into sealed, locked relation with said female half of said fluid coupling, allowing a fluid to be transferred between said spacecraft.

9. An apparatus as set forth in claim 8 wherein said receptacle is coupled to a first reservoir to which fluid is transferred, and said male connector is coupled to a second reservoir from which a fluid is removed.

10. An apparatus as set forth in claim 8 wherein said female half of said coupling is coupled to said second reservoir from which a fluid is removed, and said male half of said coupling is coupled to said first reservoir to which fluid is transferred.

* * * * *